United States Patent

Aliesch et al.

[11] Patent Number: 5,906,289
[45] Date of Patent: May 25, 1999

[54] COVER FOR A CONTAINER

[75] Inventors: Hans Peter Aliesch, Lucerne; Kurt Müller, Hitzkirch; Pius Röösli, Kriens; Hans Heinrich Walser, Grüsch, all of Switzerland

[73] Assignee: AMC International Alfa Metalcraft Corporation AG, Switzerland

[21] Appl. No.: 08/945,719
[22] PCT Filed: May 6, 1996
[86] PCT No.: PCT/CH96/00170
§ 371 Date: Nov. 5, 1997
§ 102(e) Date: Nov. 5, 1997
[87] PCT Pub. No.: WO96/35621
PCT Pub. Date: Nov. 14, 1996

[30] Foreign Application Priority Data

May 8, 1995 [CH] Switzerland .................. 1323/95

[51] Int. Cl.[6] .................................................. B65D 45/00
[52] U.S. Cl. ........................................... 220/318; 220/321
[58] Field of Search .................................. 220/318, 321, 220/320, 686

[56] References Cited

U.S. PATENT DOCUMENTS 2,133,060 10/1938 Stephens ........................ 220/321 X
2,152,634 4/1939 Cornell ............................ 220/321 X
2,191,975 2/1940 Stephens ............................ 220/321
4,294,377 10/1981 Chen .................................. 220/321
4,711,366 12/1987 Chen .................................. 220/316
5,427,014 6/1995 von der Becke et al. ............ 99/337

FOREIGN PATENT DOCUMENTS

1104323 10/1922 Germany.
23619 6/1931 Netherlands.
202348 8/1923 United Kingdom.
9413183 6/1994 WIPO.

Primary Examiner—Stephen K. Cronin
Attorney, Agent, or Firm—Webb Ziesenheim Logsdon Orkin & Hanson, P.C.

[57] ABSTRACT

The cover is intended for a container with an angled rim and has a sealing mechanism acting peripherally on the edge of the container. There is, around the edge of the cover, an open elastic metal sealing ring exerting a spring force which increases with the diameter of the sealing ring. In its position of rest the sealing ring is clamped between the end region of a part of the rim of the container and the end region of an annular angled section on the edge of the cover. The sealing mechanism comprises means for expanding the diameter of the sealing ring against said spring force.

10 Claims, 10 Drawing Sheets

COVER FOR A CONTAINER

BACKGROUND OF THE INVENTION

1. Field of the Invention

The present invention relates to a lid for a container, more particularly, a lid for a container with a bent peripheral rim.

2. Prior Art

Such a lid is known from the DE-C-360 479 comprising a closing-mechanism which can be mounted on the container independently from the lid. The closing-belt comprises a rubber-ring, which is mounted around the lid rim and the container rim, and, finally, is tightly closed with the means of a lever-mechanism. Providing of a pressure-tight junction is necessary, if a container is held under pressure, as in the case of a cooking vessel where vapor pressure is used advantageously to reduce cooking times.

In known solutions, the junction between the lid and the container is achieved by a series of lock elements which are attached to the lid, and which after positioning of the lid on the container, by means of a rotating, pivoting or gliding movement, grip under-neath the bent peripheral container rim, such that, in conjunction with an elastic joint, an over pressure can be built up in the interior of the container. These better known solutions have the disadvantages of being expensive and requiring complicated handling. The object of the invention is therefore to provide a lid for a container, in particular a cooking vessel, which is especially easy to handle.

SUMMARY OF THE INVENTION

According to the invention, the task is accomplished by a lid for a container with a bent peripheral container rim which includes a closing-mechanism acting peripherally at the rim of the container. An open, metallic closing-belt with elastic properties is lodged peripherally at the lid's rim, and the closing-belt develops a spring force which increases upon enlargement of the diameter of the closing-belt. In its rest position, the closing-belt clamps together the end region of a part of the peripheral container rim and the end region of a circular, bent part of the lid rim. The closing-mechanism includes means to enlarge the closing-belt against its own spring force. Further advantageous variants of the invention are described below.

In the following, some exemplary embodiments of the invention are explained more in detail with the help of drawings.

DESCRIPTION OF THE PREFERRED EMBODIMENTS.

The lids represented in FIG. 1, 2, 5, 8, 11, 14, 17, 24 and 26 can be fit, as indicated more in detail in FIG. 20 to 23, to a container with a bent peripheral container rim 2. The slightly convex lid 1 (FIG. 20) has a bent peripheral rim 3, too. The borders 4, 5 of the rims 2 and 3 run partly in two parallel planes; their end parts, however, may further be bent downwards to form each a circularly bent enlargement 6 and 7 respectively. The closing-mechanism according to FIG. 20 comprises a somewhat elastic, open closing-belt 8 with a C-shaped cross-section, such that the enlargements 6 and 7 fit into the C-shaped opening of belt 8. The enlargement 6 of rim 4 facilitates a clean pouring-out of the vessel contents.

Figure 1:
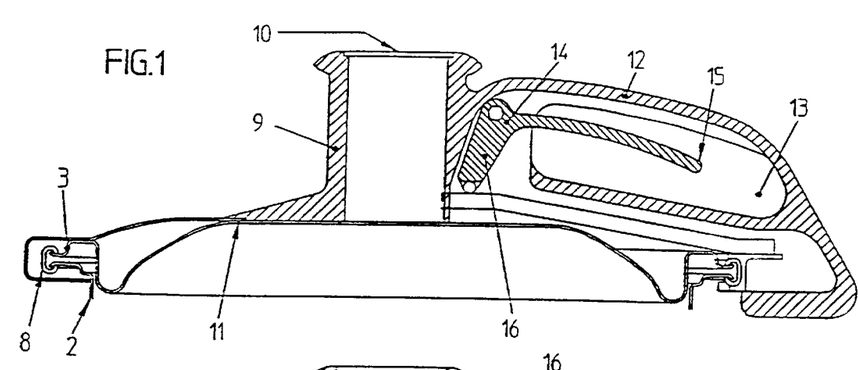
FIG. 1 shows a schematic representation (section along the axis, in the symmetry plane) of a first embodiment of a lid for a cooking vessel according to the invention, with a pincer-closing-mechanism in closed position.
Figure 2:
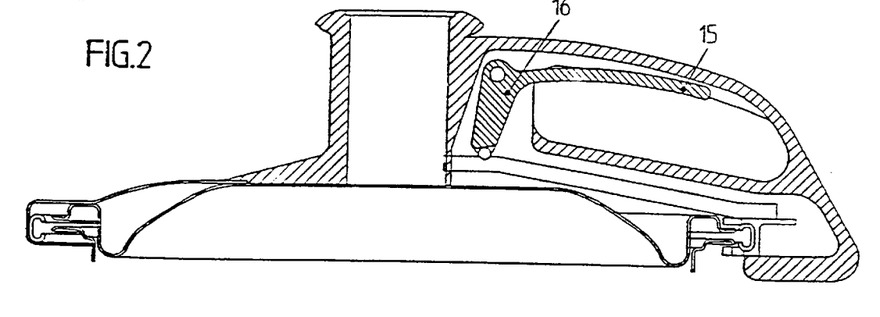
FIG. 2 shows a schematic representation of the same first embodiment, with the closing-mechanism in open position.

A knob-handle 9 with a pressure indicator 10 may be disposed at the upper part of lid 11 according to FIG. 1. Similar construction elements in the different embodiments of lid and closing-mechanism are indicated in FIG. 1 to 20 by the same referencing symbols 2 to 10. An elongated handle 12, extending radially outwards from the knob-handle 9 to somewhat more than the lid rim, is disposed on top of lid 11, according to FIG. 1. The handle 12 has an opening 13, sized as to fit for four fingers of a hand, and a pivotable L-shaped lever 14 is disposed such that its long leg is situated within the opening 13 and can be pulled upwards with the fingers. The end of the short lever leg 16 (FIG. 1 and 2) moves hereby to the right and brings the lid into the opened position (FIG. 2). This is achieved by pulling the closing-belt 8 out of its blocked position adjacent enlargement 6, against the closing-belt's own spring action; this former being of metal, e.g. steel, and able to develop a big spring force due to the big diameter-to-height ratio of its profile.

Figure 3:
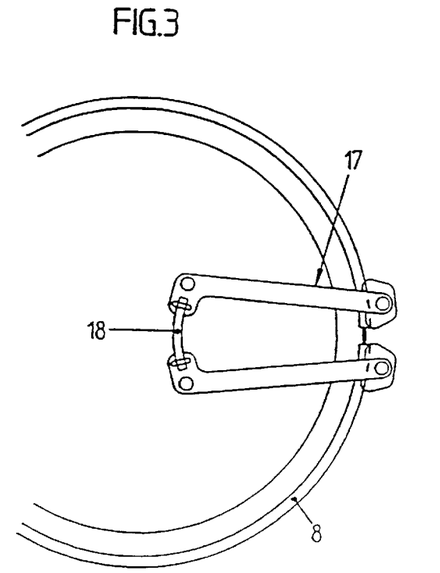
FIGS. 3 and 4 show schematic partial representations of this first embodiment (section orthogonal to the symmetry axis) with the pincer-closing-mechanism in closed and open positions respectively.

FIG. 3 shows a pincer-system 17, which may be situated above or below handle 12 and which comprises a flexible arc 18. If closing-belt 8 is in its rest position (FIG. 3), corresponding to the closed state of the closing-mechanism, it develops a force which maintains the pincer-system closed. In this state, the central part of arc 18 presses the short leg 16 of the L-shaped lever against the symmetry axis of lid 11, such that the long leg 15 of the lever, the control, is in its lower position.

Figure 4:
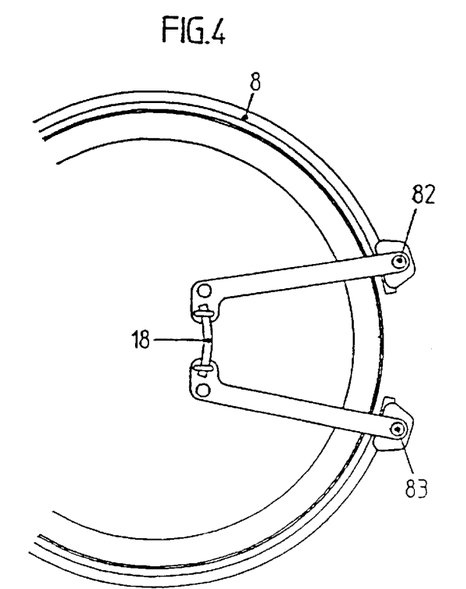

FIG. 4 shows the pincer-system 17 in the open position, in which the control 15 (FIG. 2) is in its upper position and where the end of the short leg 16 of the L-shaped lever presses the central part of arc 18 outwards, such that the pincer-system is opened against the spring force of closing-belt 8.

Figure 5:
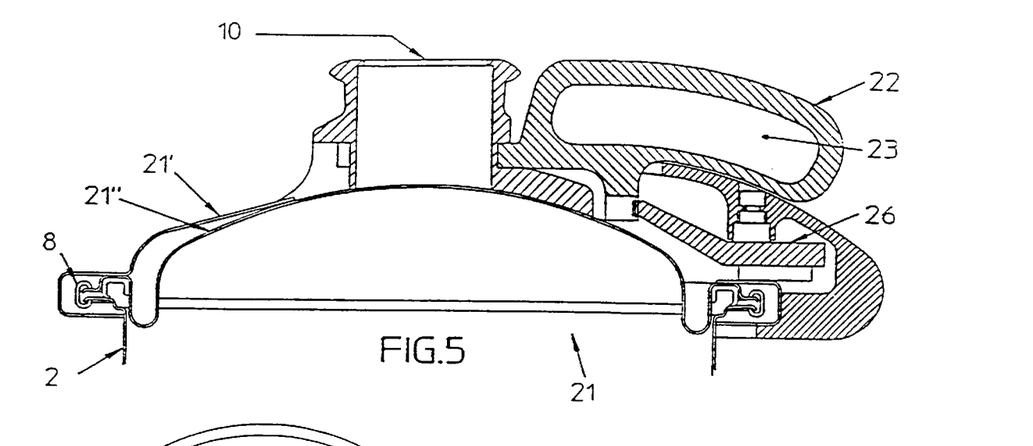
FIG. 5 shows a schematic representation (section along the axis, in the symmetry plane) of a second embodiment of a lid for a cooking vessel according to the invention, with a pivoting-handle-closing-mechanism in closed position.

The lid 21 according to FIG. 5 comprises a pivoting handle 22, extending radially outwards from the knob-handle 10 to somewhat more than the lid rim. It is as well fitted with an opening 23 to facilitate operation. The pivoting handle 22 is laterally rotatable about the central axis of knob-handle 10.

Figures 6, 7:
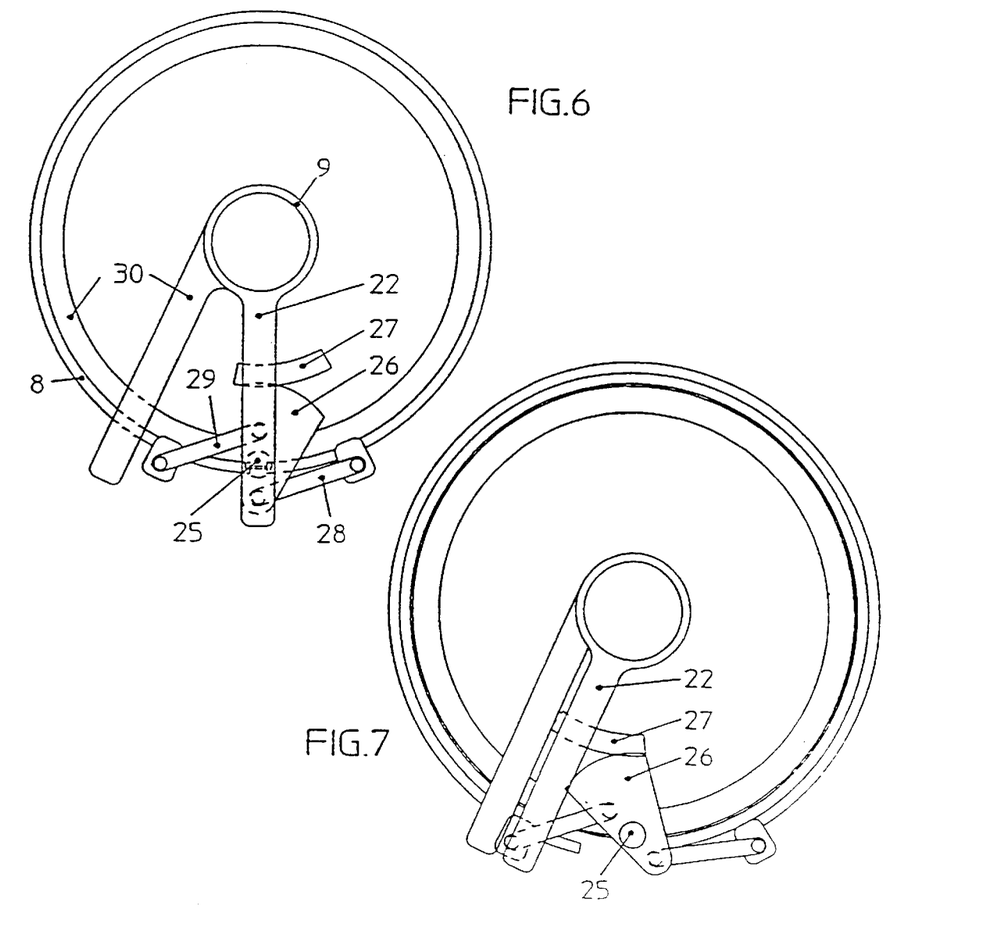
FIGS. 6 and 7 show schematic partial representations of this second embodiment (section orthogonal to the symmetry axis), with the pivoting-handle-closing-mechanism in closed and open positions respectively.

FIG. 6 shows a pivoting mechanism 24 comprising a cog-segment 26, rotating about a fixed axis 25, and a corresponding cog-bow 27 fixed at the pivoting-handle 22.

Two pivoting legs 28, 29, the ends of which are articulatably connected to the ends of closing-belt 8, are, with respect to axis 25, symmetrically disposed on cog-segment 26. On moving the pivoting-handle from the position indicated by FIG. 6 to the position indicated by FIG. 7, the movement of cog-bow 27 fixed at it is transferred onto cog-segment 26, resulting in a spreading-out of legs 28, 29 and a corresponding opening of closing-belt 8, which is in consequence freed from its pincer position. The lid according to FIG. 5 may comprise a second, fixedly disposed handle 30, serving as a counter-handle, but which is not indispensable.

Figure 8:
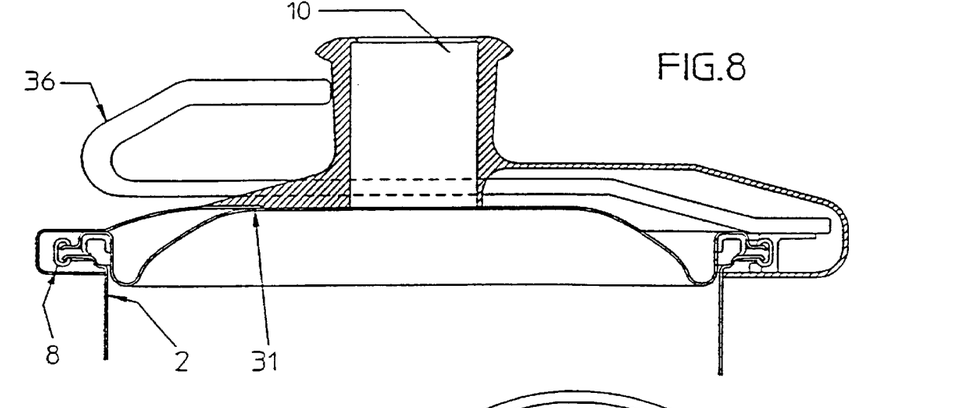
FIG. 8 shows a schematic representation (section along the axis, in the symmetry plane) of a third embodiment of a lid for a cooking vessel according to the invention, with a gripping-handle-closing-mechanism in closed position.
Figure 9:
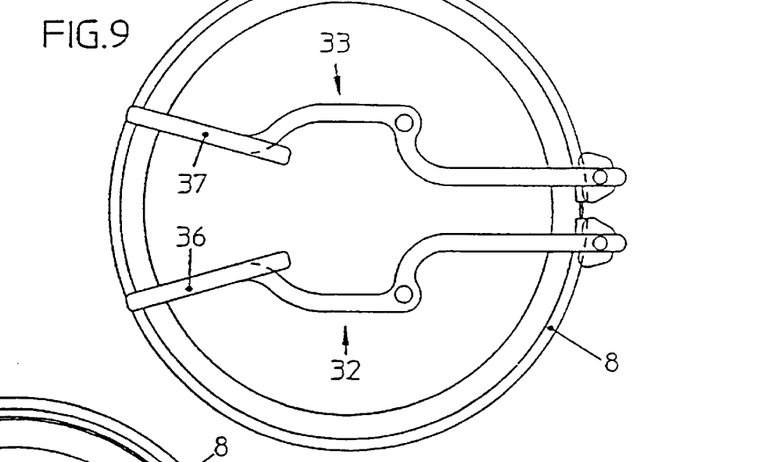
FIGS. 9 and 10 show schematic partial representations of this third embodiment (section orthogonal to the symmetry axis), with the gripping-handle-closing-mechanism in closed and open positions respectively.
Figure 10:
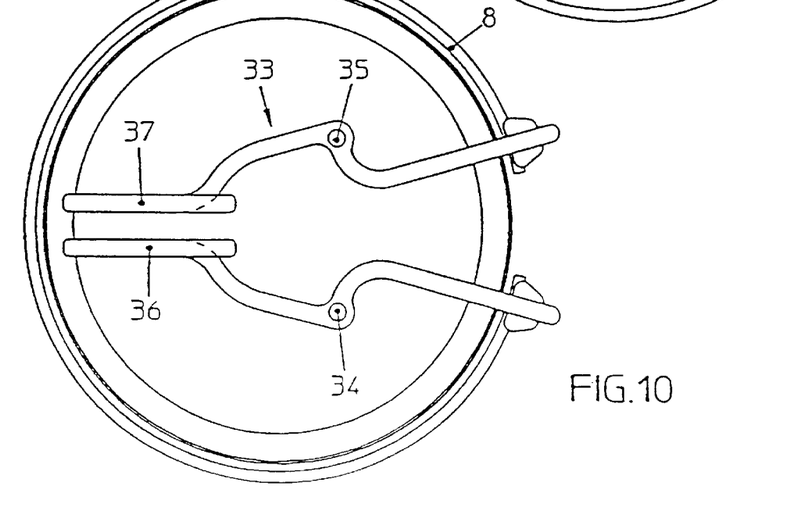

The closing-mechanism for lid 31 according to FIG. 8 comprises two gripping bows 32, 33 (FIG. 9, 10), which are pivotably disposed at each an axis 34, 35, and which extend almost diametrically across the lid. In their middle part, the gripping bows are, however, bent outwards, such as to define an empty space around knob-handle 10. One end of the gripping bows 32, 33 is each shaped as open gripping-handle 36, 37. The other ends of the gripping bows 32, 33 are articulatably connected to the ends of closing-belt 8. FIG. 9 shows the gripping arcs 32, 33 in the closed state.

On pressing the gripping-handles together (FIG. 10), the ends of the C-shaped closing-belt 8 at the diametrically opposed end of the lid are spread-out against the spring force of closing-belt 8, and the latter is opened in consequence.

Figure 11:
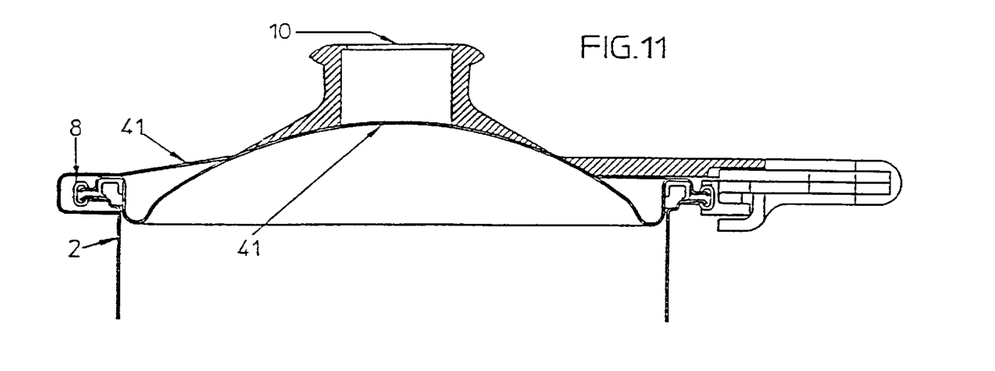
FIG. 11 shows a schematic representation (section along the axis, in the symmetry plane) of a fourth embodiment of a lid for a cooking vessel according to the invention, with an exterior-handle-closing-mechanism in closed position.

The lid 41 according to FIG. 11 comprises a flat and elongated exterior-handle 42 in the plane of the lid, fitted with an elongated opening 43 for the fingers of an operating person.

At the two extremes of the exterior-handle 42, each an L-shaped lever 44, 44' is disposed pivotably about the axes 48, 48', with each a free command leg 45, 45', disposed in the opening 43, and a second leg 47, 47', articulatably connected to each a pushing-bar 46, 46'. The pushing-bars 46, 46' cross over each other and are them selves articulatably connected to the ends of closing-belt 8.

Figures 12, 13:
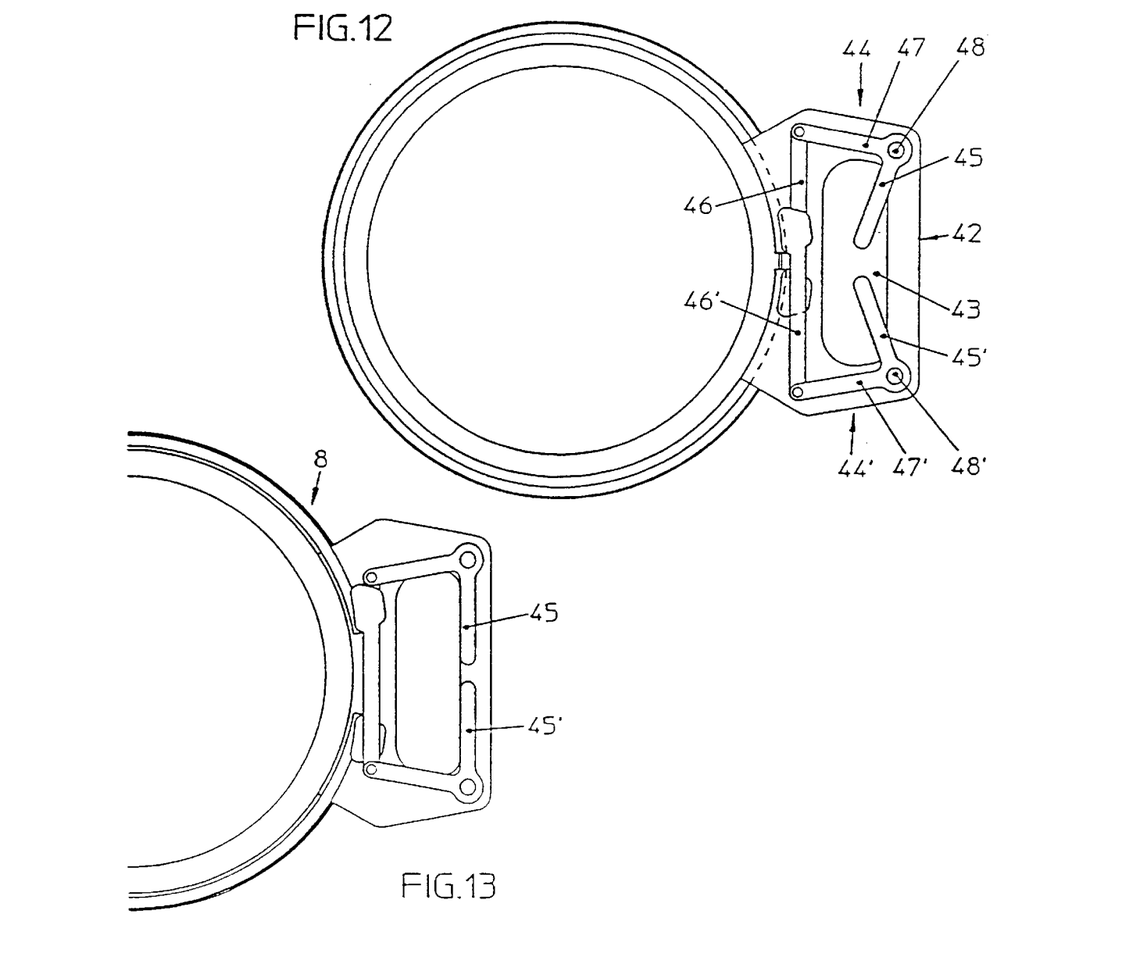
FIGS. 12 and 13 show schematic partial representations of this fourth embodiment (section orthogonal to the symmetry axis), with the exterior-handle-closing-mechanism in closed and open positions respectively.

In the closed state (FIG. 12), the command legs 45, 45' are located in the middle of the opening 43. In order to open the lid, command legs 45, 45' are pulled towards the exterior, which induces, via the crossing pushing-bars, a spreading-out of the C-shaped closing-belt 8, according to FIG. 13.

Figure 14:
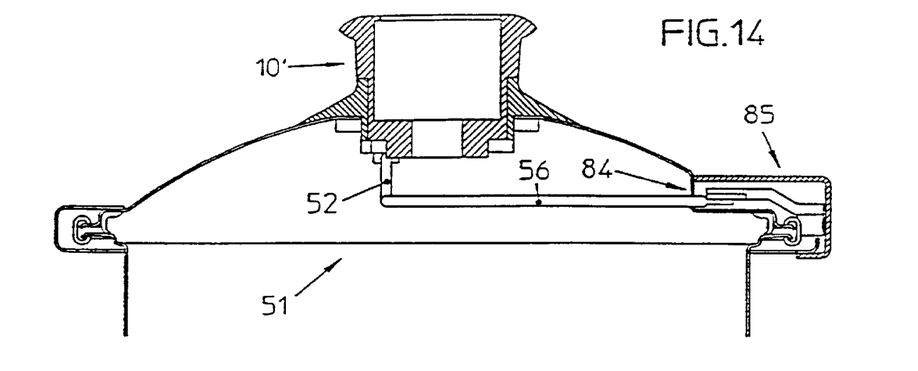
FIG. 14 shows a schematic representation (section along the axis, in the symmetry plane) of a fifth embodiment of a lid for a cooking vessel according to the invention, with a rotating-handle-closing-mechanism in closed position.
Figure 15:
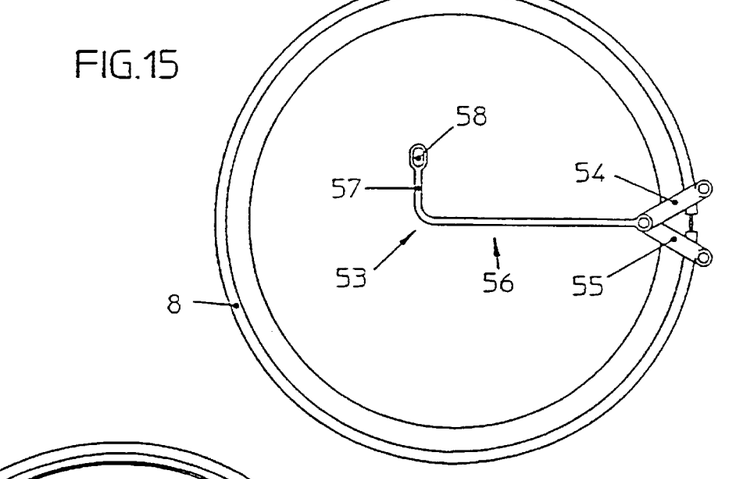
FIGS. 15 and 16 show schematic partial representations of this fifth embodiment (section orthogonal to the symmetry axis), with the rotating-handle-closing-mechanism in closed and open positions respectively.

The lid 51 according to FIG. 14 comprises a vertically rotatable knob-handle 10', which carries an eccentrically disposed pin 52, connected to a bar-mechanism 53, effecting the spreading-out of closing-belt 8. The bar-mechanism 53 comprises two preferentially equal legs 54, 55, which are articulatably connected together at one end with an essentially radially disposed bar 56. The two other ends of legs 54, 55 are articulatably connected to the ends of closing-belt 8. The opposite end 57 of bar 56 is bent and comprises at its end an elongated slit 58, into which pin 52 is fitted, to convert a rotating movement of knob-handle 10 into a shift displacement of bar 56.

Figure 16:
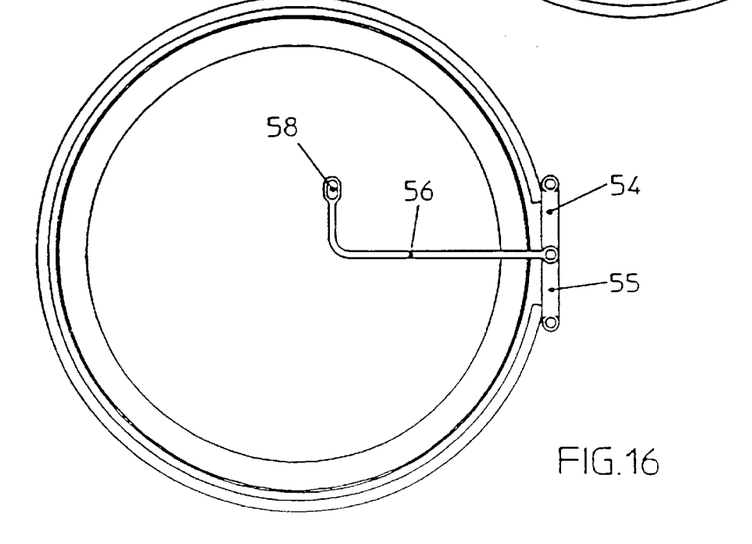

In the rest position, the legs 54, 55 adopt a V-shaped configuration, and the ends of closing-belt 8 touch each other. Upon a radial displacement towards the exterior of bar 56, legs 54, 55 move, against the spring action of closing-belt 8, into a stretched configuration (FIG. 16), with the consequence of a spreading-out of closing-belt 8.

Figure 17:
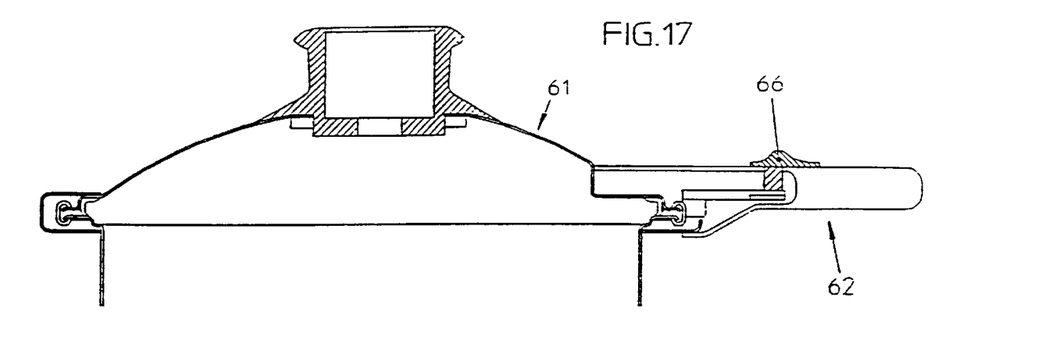
FIG. 17 shows a schematic representation (section along the axis, in the symmetry plane) of a sixth embodiment of a lid for a cooking vessel according to the invention, with an push-pull-handle-closing-mechanism in closed position.
Figures 18, 19:
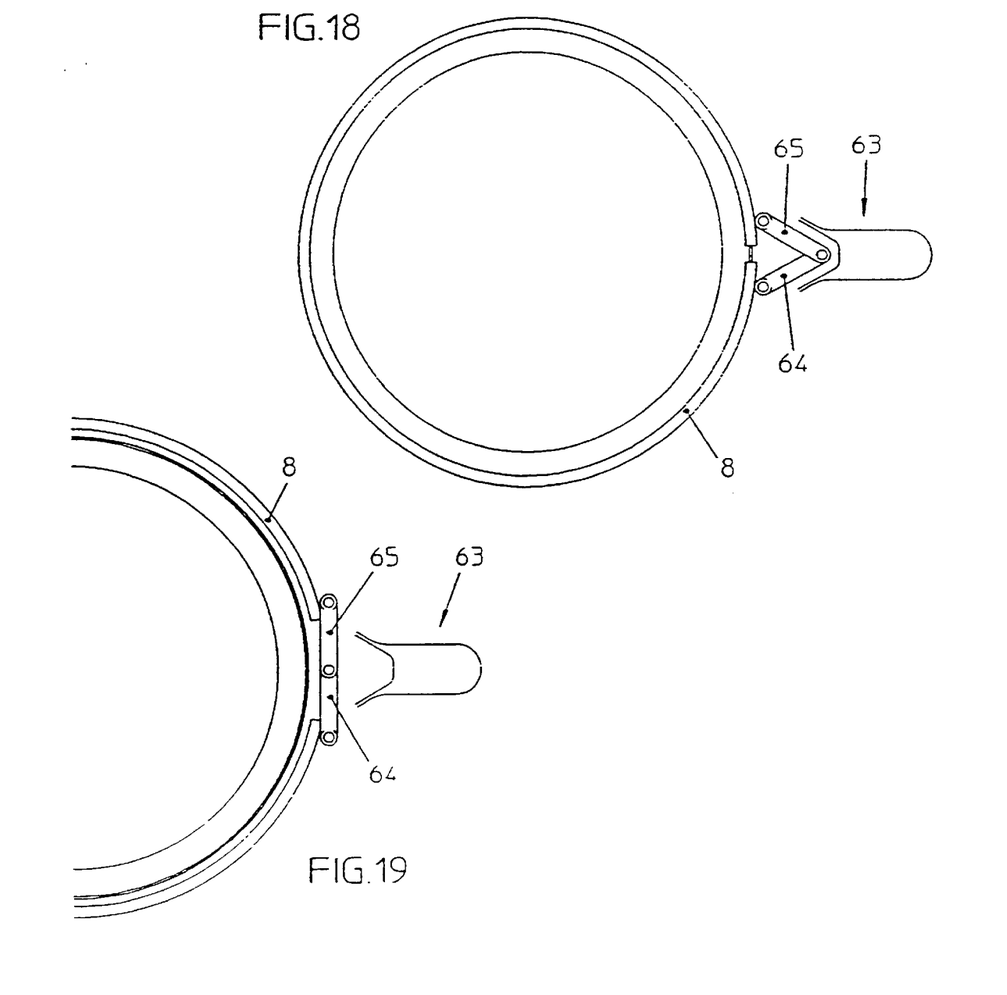
FIGS. 18 and 19 show schematic partial representations of this sixth embodiment (section orthogonal to the symmetry axis), with the push-pull-handle-closing-mechanism in closed and open positions respectively.

The lid 61 according to FIG. 17 comprises a lateral enlargement 62, serving as a carrier for a bar-mechanism 63 (FIG. 18, 19) with two legs 64, 65, and for a push-pull-handle 66 (FIG. 17). Each one of the ends of legs 64, 65 is articulatably connected to each an end of closing-belt 8. The other two ends of legs 64, 65 are connected together articulatably to push-pull-handle 66. In the rest position, legs 64, 65 adopt a V-shaped configuration, and the ends of closing-belt 8 touch each other. Upon a radial displacement of push-pull-handle 66 towards the center of the lid, legs 64, 65 adopt, against the spring action of closing-belt 8, a stretched configuration, corresponding to the open state of the lid.

Figure 20:
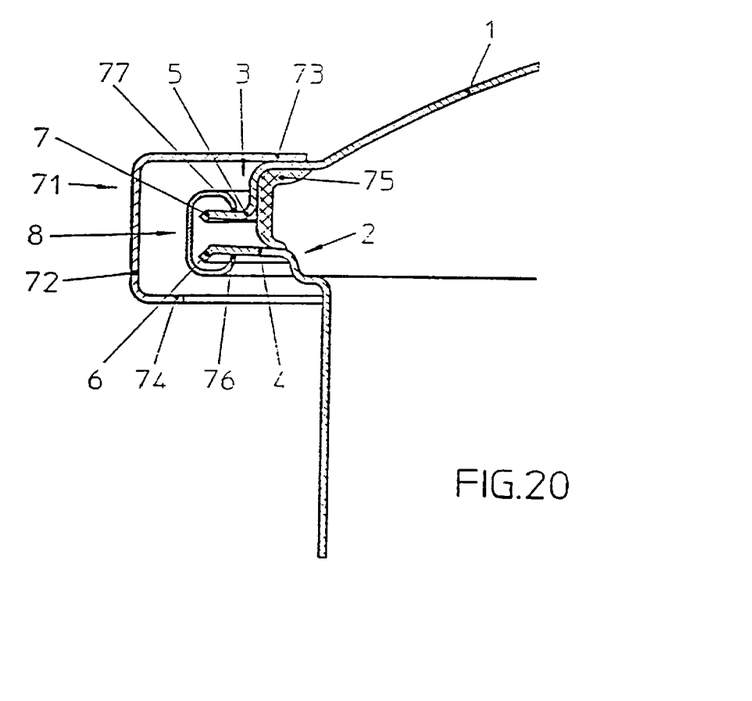
FIGS. 20 and 21 show schematic representations of the crosssection of a closing-belt for the closing-mechanisms according to the invention, in closed and open positions respectively.

FIG. 20 shows a cross-section of a simple lid 1 according to the invention, comprising a peripherally disposed hollow-body 71 having a vertical rounded wall 72, which joins each a flat, ring-shaped wall 73, 74 at its upper and at its lower end. The connection between lid 1 and hollow-body 71 may e.g. be achieved by a peripheral soldering along the interior rim of the upper ring-shaped wall 73. Preferentially, hollow-body 71 is made such that the ring-shaped walls 73 and 74 run parallel to each other. The interior diameter of the lower ring-shaped wall 74 is appreciably larger than that of the upper ring-shaped wall 73, and larger as well than the exterior nominal diameter of the vessel rim 2, such that, in the open state, the lid can easily be removed from the vessel or container.

A ring-shaped joint 75 with an essentially inverse L-shaped profile is fitted to the lid rim, as shown in FIG. 20. The joint is somewhat elastic, in order to keep parts 4 and 5 of the vessel and lid rim respectively, at a small distance apart. FIG. 20 shows closing-belt 8 in the closed state, where enlargement 6 enters behind the C-shaped aperture of closing-belt 8, such that this latter remains locked if the container is under pressure. Upon spreading-out of closing-belt 8, this latter has to glide over enlargement 6; parts 4 and 5 have hereby to approach each other and joint 75 has to be compressed. As long as the spreading force remains, closing-belt 8 rests on the lower ring-shaped wall 74 at the inner edge of hollow-body 71 in a way which is evident from FIG. 20. When the spreading force disappears, the diameter of closing-belt 8 narrows, and this latter, guided by the inclined wedge of enlargement 7, moves into the closed position.

The lid may as well comprise an upper lid 21' (FIG. 5) and a lower lid 21", and the ring-shaped joint 75 may e.g. as well have an U-profile or a G-profile. In some of the figures, for sake of simplicity, the ring-shaped joint is omitted.

Closing-belt 8 has preferentially a C-shaped cross-section; its cross-section may, however, be of any shape, even without C-opening, especially if it contains ring-shaped enlargements which effect said fixation and guiding effects.

If closing-belt 8 has a C-shaped section, as shown in FIG. 20, the downwards bent enlargements 6 and 7 may act as a retaining and a guiding wedge respectively. The enlargements 6 and 7 may as well be straight all the way, and/or bent in any variants up- and/or downwards. If another form is chosen for the section of closing-belt 8, corresponding ring-shaped enlargements or protrusions may be provided.

Figure 21:
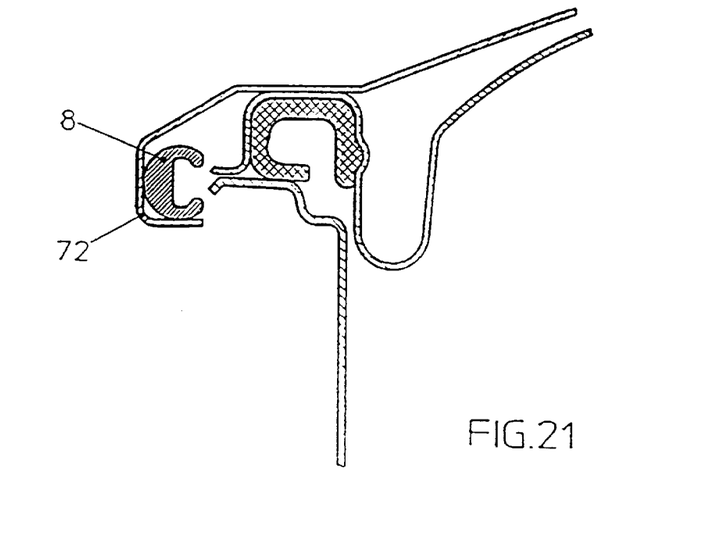

FIG. 21 shows a closing-belt, especially conceived for a double lid, in open position, where it touches wall 72 all around. This is one of the conditions to get the vessel rim completely free. The opening of the vessel occurs namely in an eccentrical movement of the closing-belt, and a final centered position is only assured through an all around touching of the closing-belt with wall 72.

The closing-mechanisms, which may be covered by a box-type construction, made of plastic or metal, may be disposed at the upper or at the lower side of the lid, or of the upper or lower lid in the case of a double lid. In such lids, at least one slit is provided, though which a connection element is conducted, connecting the closing-mechanism with the ends of closing-belt 8. To this aim, hollow-body 71 may as well comprise an interruption at the level of the connecting elements, e.g. 82 and 83 in FIG. 4, which connect the closing-mechanism with the closing-belt. In the embodiment according to FIG. 14 e.g., a hole 84, through which bar 56 may glide, is provided in place of a slit in the lid.

Figure 22:
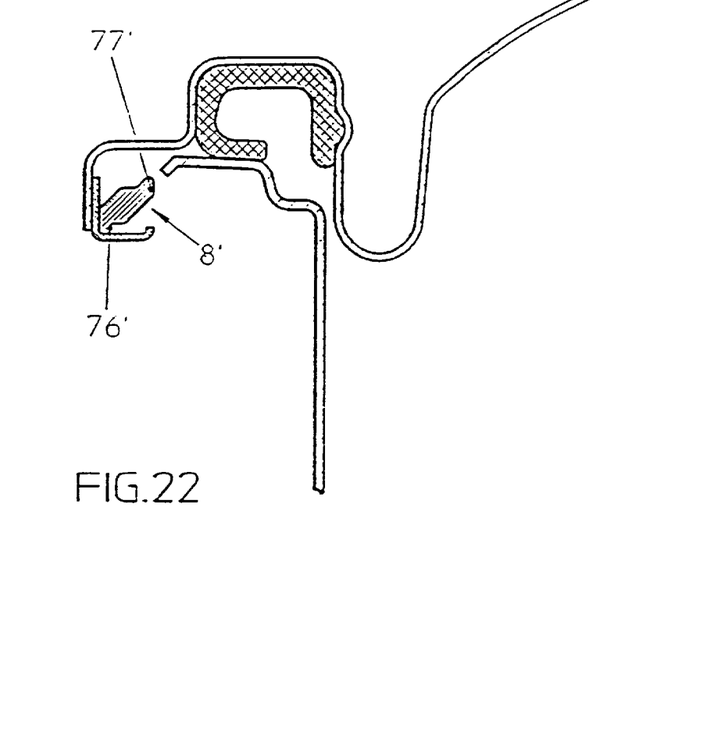
FIGS. 22 and 23 show schematic representations of the crosssection of another embodiment of a closing-belt for the various closing-mechanisms according to the invention.
Figure 23:
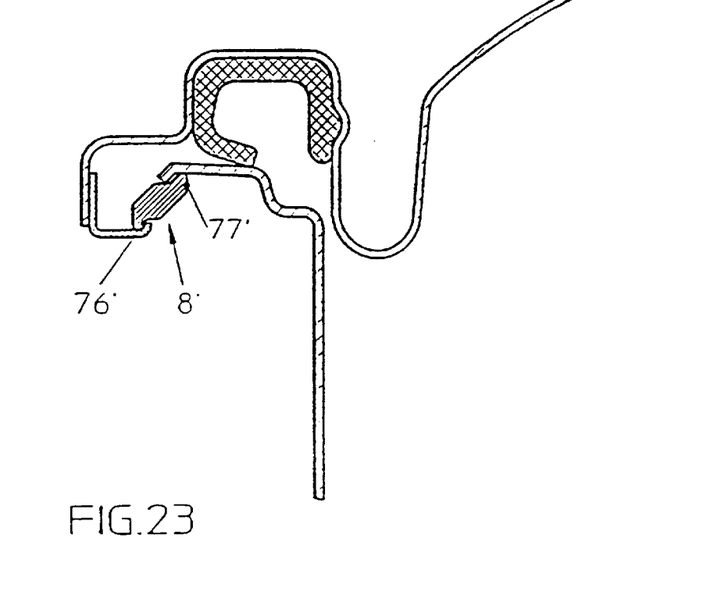

The closing-belt 8' according to FIG. 22 and 23 has approximately a rhomboidal shape and comprises two protrusions 76' and 77', which have the same function as the protrusions 76 and 77 of the C-shaped closing-belt 8.

The closing-belt 8 or 8' is preferentially pre-tended, that means that it develops a spring force even at its minimal diameter, such, that in the closed position a pressure is exerted between its two end-faces.

Figure 24:
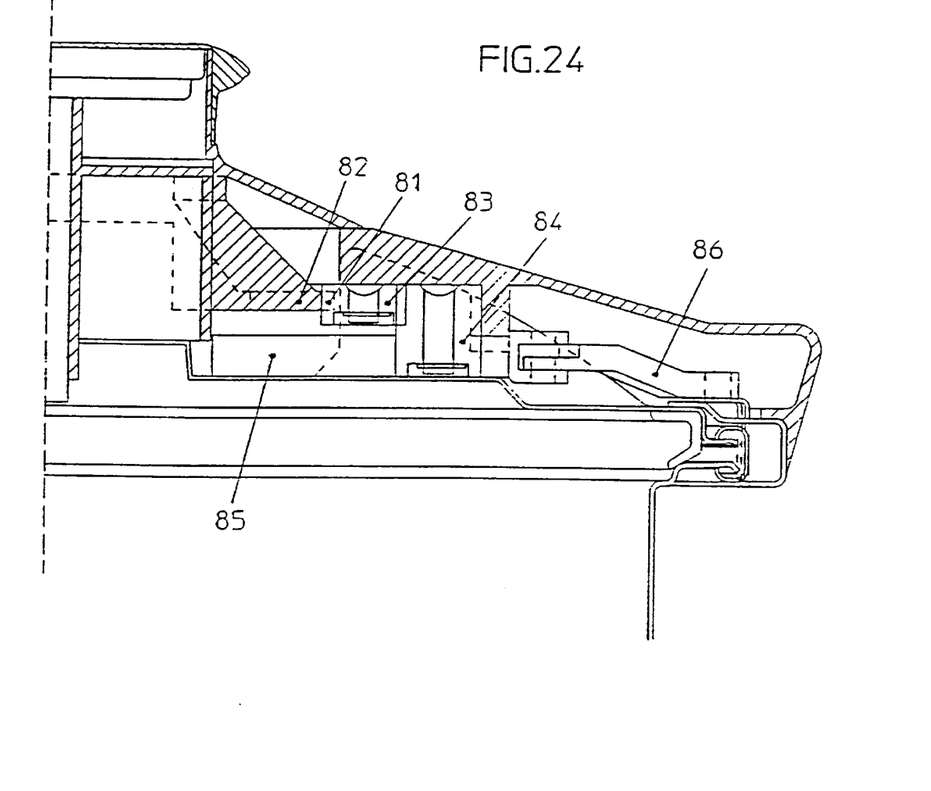
FIGS. 24 to 27 show schematic representations of two variants of the fifth embodiment with a rotating-handle-closing-mechanism.
Figure 25:
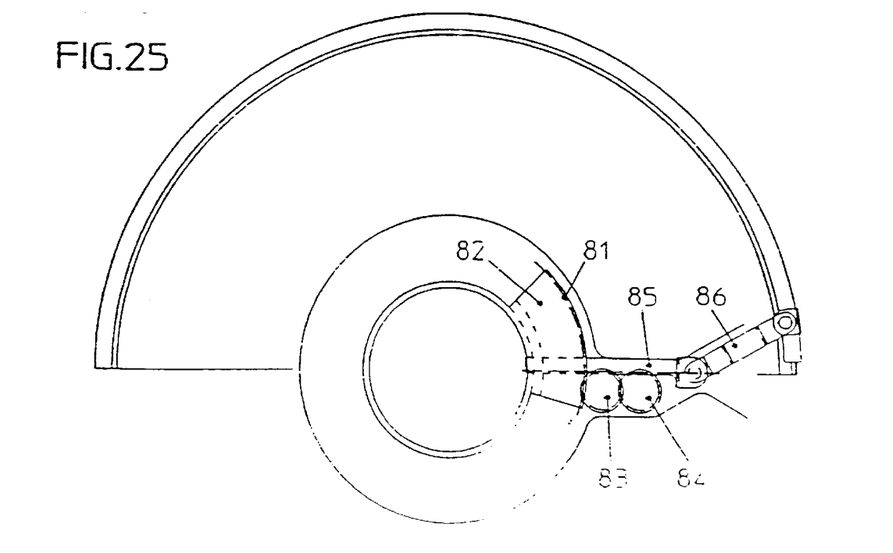
Figure 26:
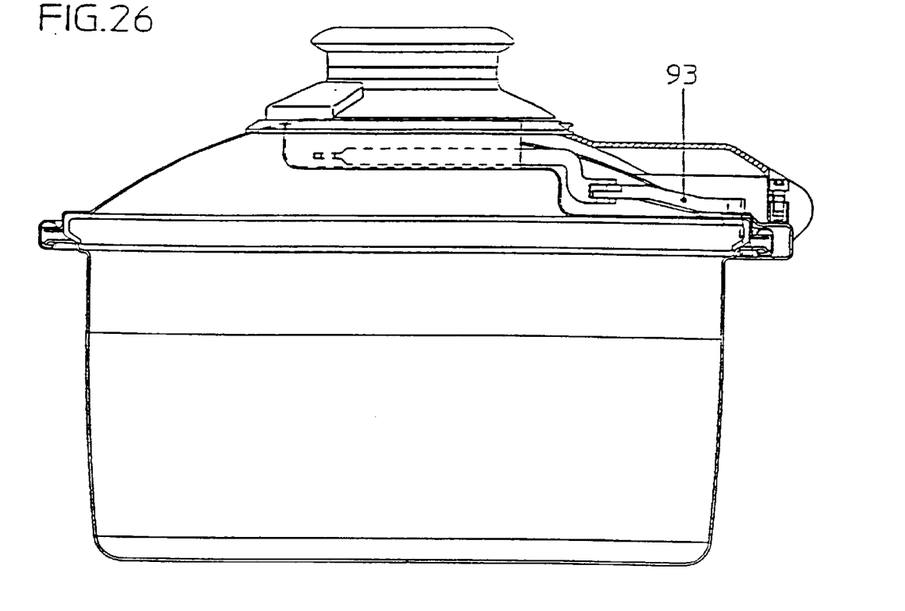
Figure 27:
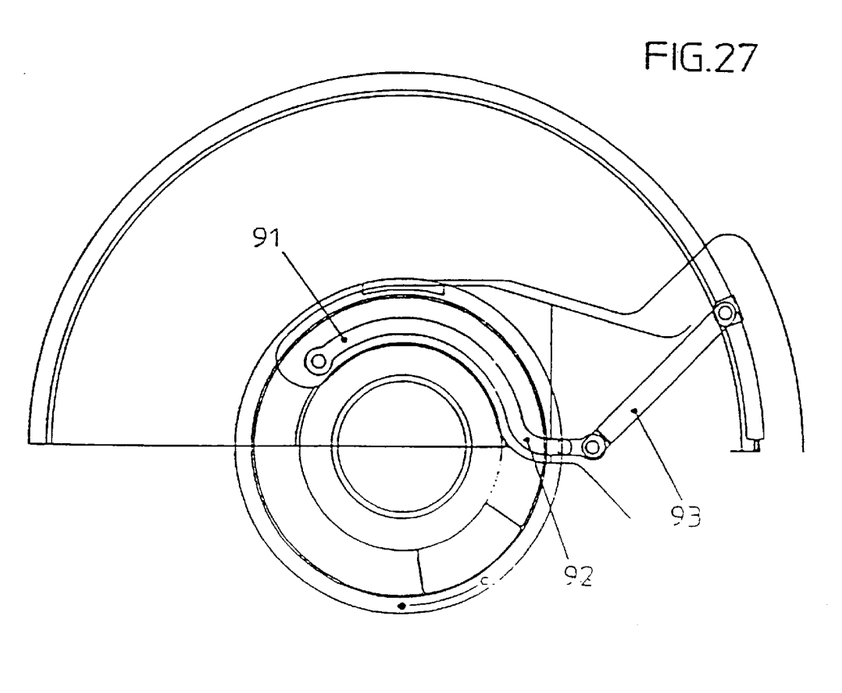

In a further variant of the fifth embodiment according to the present invention, the force transmission from the lid's knob-handle to the ends of the closing-belt 8 or 8' may be accomplished by a mechanism according to FIG. 24, 25 or to FIG. 26, 27.

In the variant according to FIG. 24, 25, the force transmission is taking place via the cog-sector 81, which is fixed at and moving with the knob-handle, and the two pinions 83 and 84, to a radially movable cog-bar 85. The end of the cog-bar 85 is articulatably connected to the ends of closing-belt 8 or 8' via two spreadable legs in a v-shaped arrangement. In the figures, only one of these legs 86 is represented. It is evident from FIG. 24, that pinion 83 is relatively flat and situated above the upper surface of the cog-bar 85, such as not to touch the latter. In the variant according to FIG. 26, 27 the force transmission is taking place via a circular arc shaped rod 91 with a curved end-part 92. The end region of this end-part 92 is articulatably connected to the ends of closing-belt 8 or 8' via two spreadable legs in a v-shaped arrangement. In the figures, only one of these legs 93 is represented.

Peripherally arranged centering means may also be used in place of the hollow-body 71. These may, e.g., be formed by guiding elements which effect a ring-shaped centering of the closing-belt (8; 8') in the open state. The hollow-body 71 may, e.g., also have openings, or be of a grid or armature shape. Preferentially, the contact surfaces between the closing-belt and the centering means have a very low coefficient of friction. Preferentially, the centering means are, at least at this contact surface, made of plastic, to form a metal/plastic couple. In another embodiment of the lid according to the invention, the closing-belt is open in the distended state, such that it develops a spring force which increases on decreasing the diameter. The corresponding closing-mechanism works then in the opposite sense.

We claim:

1. A lid for a container with a bent peripheral container rim, wherein said lid includes:

a rim;

a closing-mechanism acting peripherally at the rim of the container, the closing-mechanism comprising an open closing-belt lodged peripherally at the lid rim, said closing-belt having a large diameter compared to its height, and is able to clamp together, in a closed state, an end region of a part of the peripheral container rim and an end region of a circular, bent part of the lid rim, the closing-mechanism being adapted to change the diameter of the closing-belt, wherein said closing-belt is made from metal with elastic properties and develops a spring force which depends on a diameter of the closing-belt, and maintains an essentially non-deformable shape with respect to its height; and centering means connected to the lid, the centering means, in the open state, being adapted to circularly center the closing-belt on the lid.

2. The lid according to claim 1, wherein the centering means comprises a lateral, ring-shaped hollow-body or a plurality of singular guiding elements, the centering means being adapted to ensure enough movement space for the closing-belt and hold the closing-belt peripherally centered when the closing-belt is in an enlarged, open state.

3. The lid according to claim 1, wherein the centering means comprises a first ring-shaped wall, said first ring-shaped wall connected with the lid in the region of an inner diameter of said first ring-shaped wall and a second ring-shaped wall having an inner diameter sized such that the lid is adapted to fit onto a container.

4. The lid according to claim 1, wherein the closing-belt comprises at least one non-deformable protrusion, wherein the lid further comprises an elastic ring-shaped joint and a ring-shaped rim part with a ring-shaped enlargement, the protrusion being adapted to exert a retaining force on the lid enlargement or on a ring-shaped enlargement of a ring-shaped rim part of a container to form a non-looseable connection between the lid and the container.

5. The lid according to claim 4, wherein one of the ring-shaped protrusions of the closing-belt is adapted to interact with the enlargement of the rim part of the container, and another ring-shaped protrusion of the closing-belt is adapted to interact with an enlargement of the lid.

6. The lid according to claim 1, wherein the closing-belt comprises a C-shaped cross-section with a C-shaped opening, into which the end of a rim part of the lid and the end of a ring-shaped rim part of the container are fitted so as to pinch the closing-belt and form a non-looseable connection between the lid and the container.

7. The lid according to claim 1, wherein said lid defines an opening through which a movable connection element for the transmission of a force from the closing-mechanism to the ends of the closing-belt extends.

8. The lid according to claim 1, wherein the closing-mechanism includes a connection element coupled to a bar, said bar coupled to a pair of legs, said legs adapted to spread apart the ends of the closing-belt upon rotation of the closing-mechanism and displacement of said bar.

9. The lid according to claim 1, wherein a contact surface between the closing-belt and the centering means has a low coefficient of friction.

10. The lid according to claim 1, whereby the closing-belt develops a spring force which increases upon enlargement of the closing-belt diameter or the closing-belt is distended or both.

* * * * *

UNITED STATES PATENT AND TRADEMARK OFFICE
CERTIFICATE OF CORRECTION

PATENT NO.  : 5,906,289
DATED       : May 25, 1999
INVENTOR(S) : Hans Peter Aliesch et al.

It is certified that error appears in the above-identified patent and that said Letters Patent is hereby corrected as shown below:

```
Title Page, [56] References Cited, FOREIGN PATENT DOCUMENTS,
delete "1104323    10/1922    Germany" and insert:
    --1104323      11/1955    France
       360479      10/1922    Germany--.
```

Column 1 Line 48 before "drawings." insert --the--.

Column 1 after Line 48 insert --BRIEF DESCRIPTION OF THE DRAWINGS--.

Column 2 Line 28 "with an" should read --with a--.

Column 3 Line 50 "at each an axis" should read --at each axis--.

Column 3 Line 66 after "each" delete --an--.

Column 4 Line 4 "them selves" should read --themselves--.

Column 5 Line 9 "an U-profile" should read --a U-profile--.

Signed and Sealed this

Twenty-third Day of November, 1999

Attest:

Q. TODD DICKINSON

*Attesting Officer*    *Acting Commissioner of Patents and Trademarks*